(12) United States Patent  (10) Patent No.: US 8,559,041 B2
Ohtake  (45) Date of Patent: Oct. 15, 2013

(54) IMAGE OUTPUT INSTRUCTING DEVICE, IMAGE OUTPUT INSTRUCTING METHOD, AND STORAGE MEDIUM FOR DETERMINING A PROCESSING STATE OF AN IMAGE OUTPUT INSTRUCTION

(75) Inventor: Yu Ohtake, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 194 days.

(21) Appl. No.: 13/248,827

(22) Filed: Sep. 29, 2011

(65) Prior Publication Data

US 2012/0250080 A1  Oct. 4, 2012

(30) Foreign Application Priority Data

Mar. 28, 2011 (JP) ................................. 2011-070623

(51) Int. Cl.
*G06F 3/12* (2006.01)
(52) U.S. Cl.
USPC .......................... 358/1.15; 358/1.14; 709/203
(58) Field of Classification Search
USPC ................................. 358/1.15, 1.14; 709/203
See application file for complete search history.

(56) References Cited

U.S. PATENT DOCUMENTS

2001/0052995 A1*  12/2001  Idehara ......................... 358/1.15
2010/0042673 A1*   2/2010  Dayley ........................... 709/203
2010/0165376 A1*   7/2010  Matsuyama ................... 358/1.14
2011/0276980 A1*  11/2011  Nishihara et al. ............. 718/104

FOREIGN PATENT DOCUMENTS

JP           08-272557 A    10/1996
JP         2002-163086 A     6/2002
JP             3720740 B2   11/2005

* cited by examiner

*Primary Examiner* — Qian Yang
(74) *Attorney, Agent, or Firm* — Sughrue Mion, PLLC

(57) ABSTRACT

An image output instructing device includes a receiving unit that receives an image output instruction to information processing devices selected from information processing devices including at least a first information processing device belonging to a first group and at least a second information processing device belonging to a second group; a processing state acquiring unit that acquires processing states of image output requests; a processing state determining unit that, if the image output requests include an image output request to the first information processing device and an image output request to the second information processing device, determines a processing state of the image output instruction based on the processing state of the image output request to the first information processing device, regardless of at least part of processing states into which the image output request to the second information processing device is possibly brought.

7 Claims, 12 Drawing Sheets

FIG. 5A

| STATE | TRANSITION ORDER |
|---|---|
| WAITING FOR PROCESSING | 1 |
| CONVERTING DATA | 2 |
| WAITING FOR TRANSFER | 3 |
| TRANSFERRING | 4 |
| STORED IN PRINTER | 5 |
| OUTPUTTING | 6 |
| OUTPUT COMPLETED | 7 |
| CANCELED | 8 |
| ABNORMALLY ENDED | 9 |

FIG. 5B

| STATE | TRANSITION ORDER |
|---|---|
| WAITING FOR PROCESSING | 1 |
| CONVERTING DATA | 2 |
| WAITING FOR TRANSFER | 3 |
| TRANSFERRING | 4 |
| STORED IN PRINTER | 5 |
| OUTPUTTING | 6 |
| OUTPUT COMPLETED (EXCLUDING DECENTRALIZED OUTPUT OF DRAWING) | 7 |
| OUTPUT COMPLETED | 8 |
| CANCELED | 9 |
| ABNORMALLY ENDED | 10 |

FIG. 6A

| ID | STATE | IMAGE OUTPUT INSTRUCTION ID | NECESSITY OF REFERENCE |
|---|---|---|---|
| 10001 | CONVERTING DATA | A0001 | REQUIRED |
| 10002 | WAITING FOR PROCESSING | A0001 | REQUIRED |
| 10003 | CONVERTING DATA | A0001 | NOT-REQUIRED |
| 10004 | WAITING FOR PROCESSING | A0002 | REQUIRED |
| 10005 | WAITING FOR PROCESSING | A0002 | REQUIRED |
| 10006 | WAITING FOR PROCESSING | A0002 | NOT-REQUIRED |
| 10007 | WAITING FOR PROCESSING | A0002 | REQUIRED |

FIG. 6B

| ID | STATE |
|---|---|
| A0001 | CONVERTING DATA |
| A0002 | WAITING FOR PROCESSING |

FIG. 7A

| STATE | NECESSITY OF REFERENCE |
|---|---|
| WAITING FOR PROCESSING | NOT-REQUIRED |
| CONVERTING DATA | NOT-REQUIRED |
| WAITING FOR TRANSFER | NOT-REQUIRED |
| TRANSFERRING | NOT-REQUIRED |
| STORED IN PRINTER | NOT-REQUIRED |
| OUTPUTTING | NOT-REQUIRED |
| OUTPUT COMPLETED | NOT-REQUIRED |
| CANCELED | NOT-REQUIRED |
| ABNORMALLY ENDED | REQUIRED |

FIG. 7B

| STATE | NECESSITY OF REFERENCE |
|---|---|
| WAITING FOR PROCESSING | NOT-REQUIRED |
| CONVERTING DATA | NOT-REQUIRED |
| WAITING FOR TRANSFER | NOT-REQUIRED |
| TRANSFERRING | NOT-REQUIRED |
| STORED IN PRINTER | NOT-REQUIRED |
| OUTPUTTING | NOT-REQUIRED |
| OUTPUT COMPLETED (EXCLUDING DECENTRALIZED OUTPUT OF DRAWING) | NOT-REQUIRED |
| OUTPUT COMPLETED | REQUIRED |
| CANCELED | NOT-REQUIRED |
| ABNORMALLY ENDED | NOT-REQUIRED |

FIG. 9

| No. | IMAGE OUTPUT INSTRUCTION (A0001) | IMAGE OUTPUT REQUEST (10001) | IMAGE OUTPUT REQUEST (10002) | IMAGE OUTPUT REQUEST (10003) |
|---|---|---|---|---|
| 1 | WAITING FOR PROCESSING | WAITING FOR PROCESSING | WAITING FOR PROCESSING | WAITING FOR PROCESSING |
| 2 | CONVERTING DATA | CONVERTING DATA | WAITING FOR PROCESSING | CONVERTING DATA |
| 3 | TRANSFERRING | TRANSFERRING | CONVERTING DATA | WAITING FOR TRANSFER |
| 4 | OUTPUTTING | OUTPUTTING | TRANSFERRING | WAITING FOR TRANSFER |
| 5 | OUTPUTTING | OUTPUT COMPLETED | OUTPUTTING | WAITING FOR TRANSFER |
| 6 | OUTPUT COMPLETED (EXCLUDING DECENTRALIZED OUTPUT OF DRAWING) | ... | OUTPUT COMPLETED | ... |
|  | ... | OUTPUT COMPLETED | OUTPUT COMPLETED | ... |
| 7 | OUTPUT COMPLETED | OUTPUT COMPLETED | OUTPUT COMPLETED | OUTPUT COMPLETED |

FIG. 10

| No. | IMAGE OUTPUT INSTRUCTION (A0001) | IMAGE OUTPUT REQUEST (10001) | IMAGE OUTPUT REQUEST (10002) | IMAGE OUTPUT REQUEST (10003) |
|---|---|---|---|---|
| 1 | WAITING FOR PROCESSING | WAITING FOR PROCESSING | WAITING FOR PROCESSING | WAITING FOR PROCESSING |
| 2 | CONVERTING DATA | CONVERTING DATA | WAITING FOR PROCESSING | CONVERTING DATA |
| 3 | TRANSFERRING | TRANSFERRING | CONVERTING DATA | WAITING FOR TRANSFER |
| 4 | OUTPUTTING | OUTPUTTING | TRANSFERRING | WAITING FOR TRANSFER |
| 5 | OUTPUTTING | OUTPUT COMPLETED | OUTPUTTING | WAITING FOR TRANSFER |
| 6 | OUTPUT COMPLETED (EXCLUDING DISPERSIVE RELEASE OF DRAWING) | OUTPUT COMPLETED | OUTPUT COMPLETED | WAITING FOR TRANSFER |
| | ... | ... | ... | ... |
| 7 | ABNORMALLY ENDED | OUTPUT COMPLETED | OUTPUT COMPLETED | ABNORMALLY ENDED |

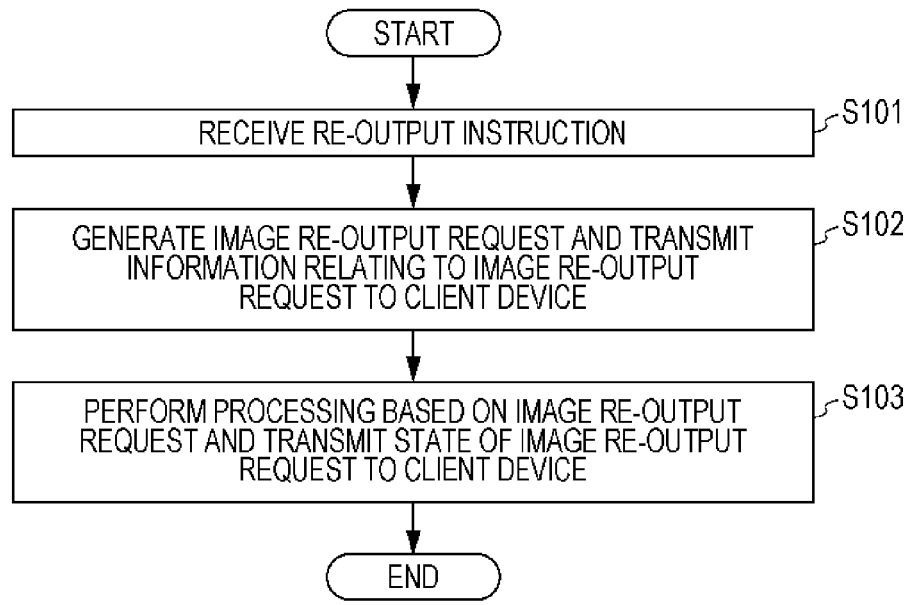
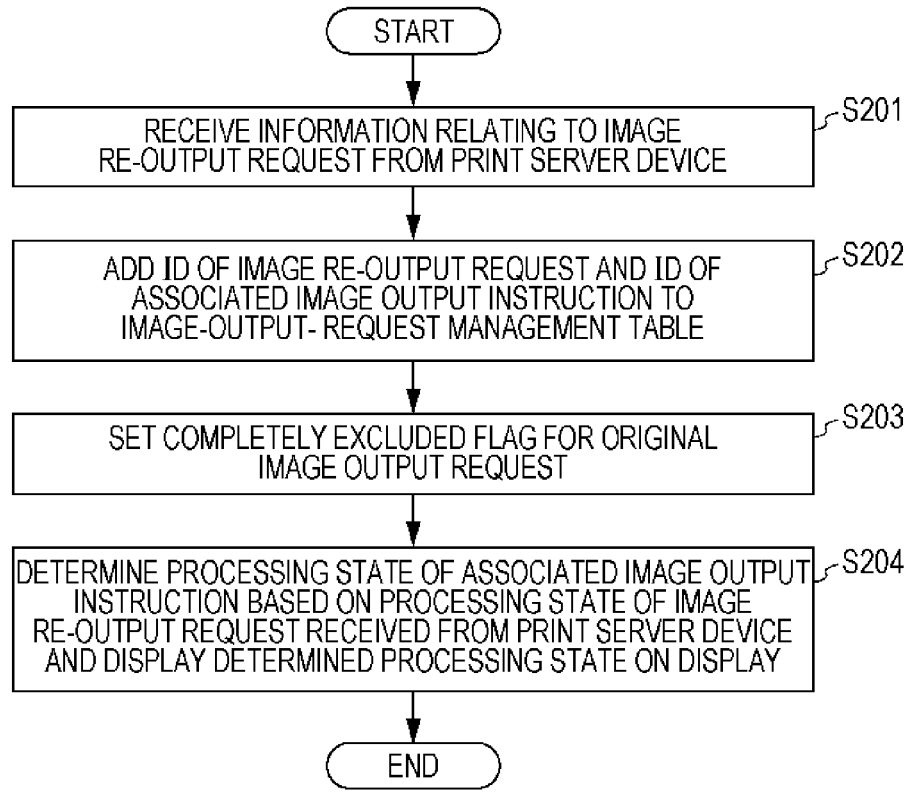

FIG. 12

| ID | STATE | IMAGE OUTPUT INSTRUCTION ID | NECESSITY OF REFERENCE |
|---|---|---|---|
| 10001 | CONVERTING DATA | A0001 | REQUIRED |
| 10002 | WAITING FOR PROCESSING | A0001 | REQUIRED |
| 10003 | CONVERTING DATA | A0001 | COMPLETELY EXCLUDED |
| 10004 | WAITING FOR PROCESSING | A0002 | REQUIRED |
| 10005 | WAITING FOR PROCESSING | A0002 | REQUIRED |
| 10006 | WAITING FOR PROCESSING | A0002 | NOT-REQUIRED |
| 10007 | WAITING FOR PROCESSING | A0002 | REQUIRED |
| 10008 | WAITING FOR PROCESSING | A0001 | NOT-REQUIRED |

FIG. 13A

| STATE | TRANSITION ORDER |
|---|---|
| WAITING FOR PROCESSING | 1 |
| CONVERTING DATA | 2 |
| WAITING FOR TRANSMISSION | 3 |
| TRANSMITTING | 4 |
| TRANSMISSION COMPLETED | 5 |
| CANCELED | 6 |
| ABNORMALLY ENDED | 7 |

FIG. 13B

| STATE | TRANSITION ORDER |
|---|---|
| WAITING FOR PROCESSING | 1 |
| CONVERTING DATA | 2 |
| WAITING FOR TRANSMISSION | 3 |
| TRANSMITTING | 4 |
| TRANSMISSION COMPLETED | 5 |
| CANCELED | 6 |
| ABNORMALLY ENDED | 7 |

FIG. 13C

| STATE | TRANSITION ORDER |
|---|---|
| WAITING FOR PROCESSING | 1 |
| CONVERTING DATA | 2 |
| WAITING FOR TRANSFER | 3 |
| TRANSFERRING | 4 |
| TRANSFER COMPLETED | 5 |
| CANCELED | 6 |
| ABNORMALLY ENDED | 7 |

IMAGE OUTPUT INSTRUCTING DEVICE, IMAGE OUTPUT INSTRUCTING METHOD, AND STORAGE MEDIUM FOR DETERMINING A PROCESSING STATE OF AN IMAGE OUTPUT INSTRUCTION

CROSS-REFERENCE TO RELATED APPLICATIONS

This application is based on and claims priority under 35 USC 119 from Japanese Patent Application No. 2011-070623 filed Mar. 28, 2011.

BACKGROUND (i) Technical Field

The present invention relates to an image output instructing device, an image output instructing method, and a storage medium.

(ii) Related Art

In an image output system in which plural image forming devices are connected with a network, such as a local-area network (LAN) or the Internet, a processing state of an image output request (occasionally called "print job") that is issued based on an image output instruction input by a user is displayed on a display.

SUMMARY

According to an aspect of the invention, there is provided an image output instructing device including a receiving unit that receives an image output instruction which is an instruction of image output to information processing devices selected from a plurality of information processing devices including at least an information processing device belonging to a first group and at least an information processing device belonging to a second group; a processing state acquiring unit that acquires processing states of a plurality of image output requests which are generated based on the image output instruction received by the receiving unit and respectively request the selected information processing devices to perform image output; a processing state determining unit that, if the plurality of image output requests include an image output request to the information processing device belonging to the first group and an image output request to the information processing device belonging to the second group, determines a processing state of the image output instruction based on the processing state of the image output request to the information processing device belonging to the first group acquired by the processing state acquiring unit, regardless of at least part of processing states into which the image output request to the information processing device belonging to the second group is possibly brought; and a display controller that causes the determined processing state of the image output instruction to be displayed on a display.

BRIEF DESCRIPTION OF THE DRAWINGS

Exemplary embodiment(s) of the present invention will be described in detail based on the following figures, wherein:

FIGS. 5A and 5B are illustrations showing an example of an image-output-request state list table and an example of an image-output-instruction state list table;

FIGS. 6A and 6B are illustrations showing an example of an image-output-request management table and an example of an image-output-instruction management table;

FIGS. 7A and 7B are illustrations showing an example of a reference-required state setting table for an image output request and an example of a reference-required state setting table for an image output instruction;

FIG. 9 is a table showing an example of state transition;

FIG. 10 is a table showing an example of state transition;

FIGS. 11A and 11B are flowcharts showing processing by the print server device and the client device, the processing relating to re-output of an image output request;

FIG. 12 is an illustration showing an example of an image-output-request management table to which an image re-output request is added; and FIGS. 13A to 13C are illustrations showing examples of image-output-request state list tables when an e-mail is transmitted, a facsimile is transmitted, and data is transferred to a folder as output of image data.

DETAILED DESCRIPTION

Embodiment

Configuration

Figure 1:
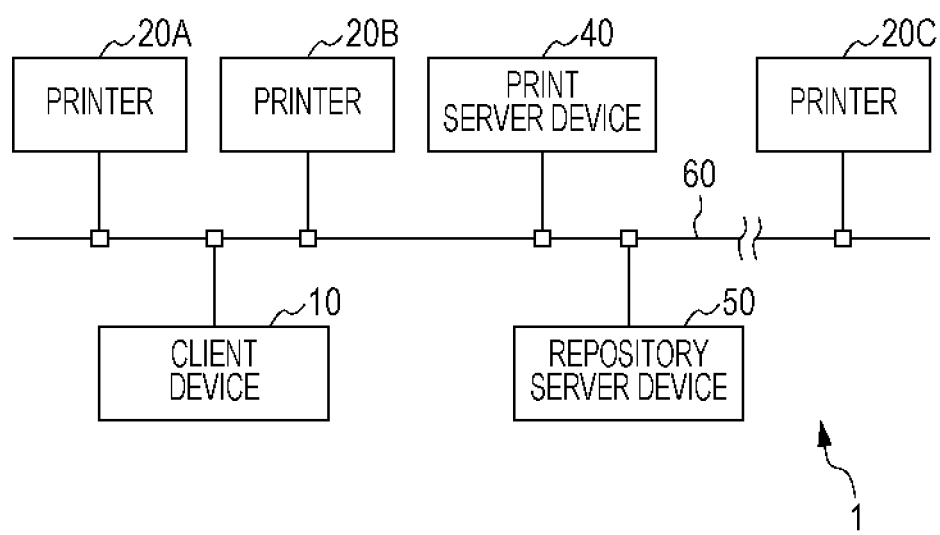
FIG. 1 is a block diagram showing a configuration of an image output system according to an exemplary embodiment of the invention.

An exemplary embodiment of the present invention will be described below with reference to attached drawings. FIG. 1 is a block diagram schematically showing a configuration example of an image output system 1 according to an exemplary embodiment of the invention. In this exemplary embodiment, the image output system 1 includes a client device 10, printers 20A, 20B, and 20C, a print server device 40, a repository server device 50, and a network 60 that connects these devices with each other. For example, the image output system 1 is used for output operation of a drawing (drawing-output operation) in a manufacturing company.

Figure 2:
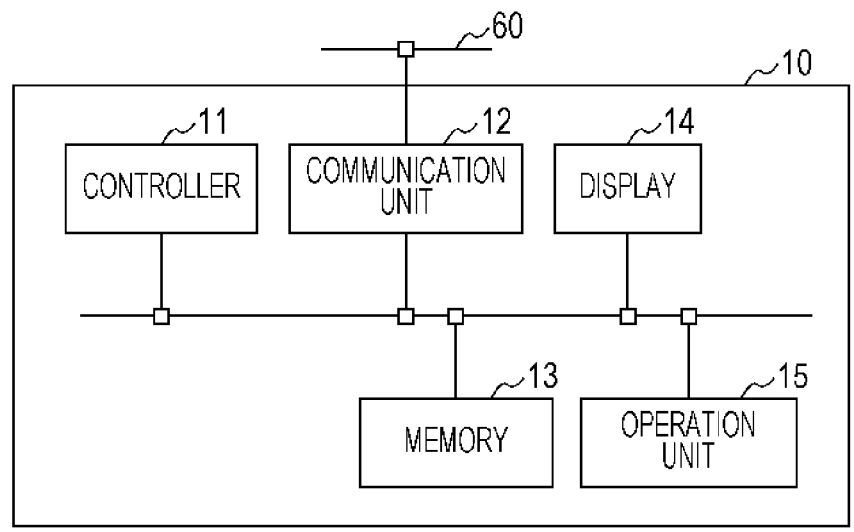
FIG. 2 is a block diagram showing a hardware configuration of a client device.

For example, the client device 10 is a computer device that a user who performs output operation of a drawing (drawing-output operator) uses. As shown in FIG. 2, the client device 10 includes a controller 11, a communication unit 12, a memory 13, a display 14, and an operation unit 15. The controller 11 includes a CPU, a ROM, a RAM, and the like. Respective units of the client device 10 are controlled by executing programs stored in the ROM and the memory 13, and hence various functions are realized. The communication unit 12 controls communication with the print server device 40 through the network 60. For example, the memory 13 is hard disk or a flash memory, and stores various programs and data. For example, the display 14 is a liquid crystal display panel, and displays various information under control of the controller 11. The operation unit 15 includes a touch panel arranged on a screen of the liquid crystal display panel or a handler such as a numeric keypad, and outputs an operation signal corresponding to operation made by the touch panel or the handler to the controller 11.

The memory 13 stores various tables used when a processing state of an image output instruction is determined (described later). The various tables include an image-output-request state list table, an image-output-instruction state list table, an image-output-request management table, an image-output-instruction management table, a reference-required state setting table for an image output request, and a reference-required state setting table for an image output instruction. The programs stored in the memory 13 include a program that provides a graphical user interface (GUI) that is used when a user makes an image output instruction or an image re-output instruction with the client device 10.

The printers 20A and 20B from among the printers 20A to 20C are arranged near the client device 10 (for example, in the same room), and are managed by a drawing-output operator who is a user of the client device 10. In particular, the drawing-output operator is able to turn ON and OFF power supplies of the printers 20A and 20B, and checks states of the printers 20A and 20B (for example, normal operation, out of sheet, sheet clogging, or out of toner) and states of sheets having images formed thereon and output from the printers 20A and 20B. When the sheets having the images formed thereon are output from the printers 20A and 20B, the drawing-output operator sends the output sheets to a predetermined distribution target (centralized output of drawings).

The printer 20C is installed at a position far from the client device 10, such as a printer installed in an overseas department. The printer 20C is used to output drawings in a department that requires drawings etc. to reduce distribution cost and to shorten lead time (decentralized output of drawings). Since the printer 20C is far from the client device 10, the printer 20C is not under the management by the drawing-output operator. In particular, the drawing-output operator is not able to turn ON and OFF a power supply of the printer 20C; or is not able to check a state of the printer 20C or a state of a sheet having an image formed thereon and output from the printer 20C. Owing to this, processing of an image output instruction (or an image output request issued based on the instruction) that instructs image output from the printer 20C may not be completed if the power supply of the printer 20C is turned OFF because of a time-zone difference or if supplies such as toner or paper of the printer 20C is insufficient. To ensure the security, a confidential print function may be used for an image output instruction to the printer 20C. The confidential print function is, for example, a function that stores image data to be output in a folder of a specific user (a confidential folder) secured in a memory of the printer 20C and allows the image data to be output when receiving an output instruction from the user. When the confidential print function is used, the image data may be left without being output, for example, in a case in which the specific user is not aware of the image data stored in the folder.

The printers 20A and 20B each are an example of an information processing device belonging to a first group. The printer 20C is an example of an information processing device belonging to a second group. In the following description, the printers 20A and 20B each are occasionally called printer for centralized output of drawings, and the printer 20C is occasionally called printer for decentralized output of drawings.

Figure 3:
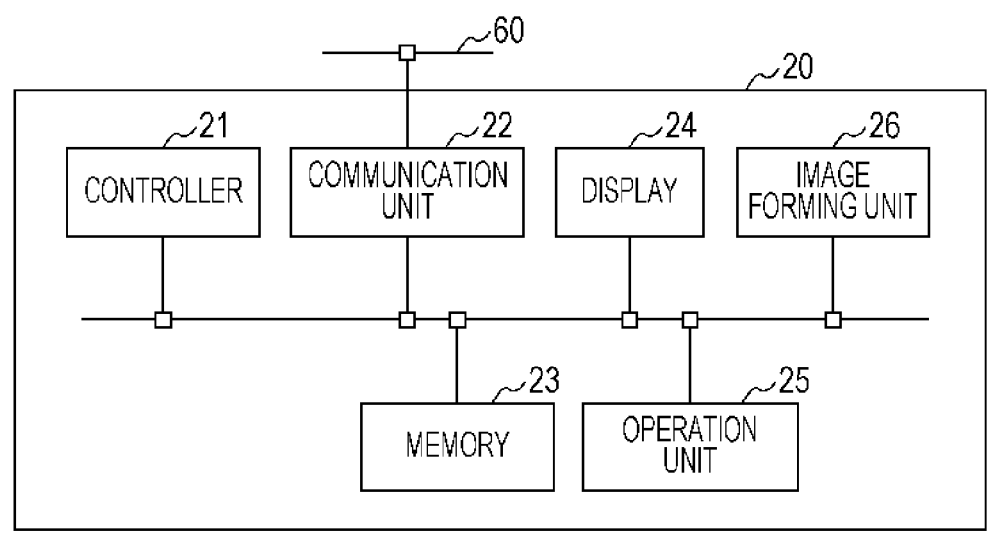
FIG. 3 is a block diagram showing a hardware configuration of a printer.

The printers 20A to 20C may have basically the same configuration. When the printers are not distinguished from one another in the following description, the characters added to the reference signs are omitted, and the printers 20A to 20C are called printer(s) 20. FIG. 3 is a block diagram showing an exemplary configuration of the printer 20. The printer 20 includes a controller 21, a communication unit 22, a memory 23, a display 24, an operation unit 25, and an image forming unit 26. The controller 21 includes a CPU, a ROM, a RAM, and the like. Respective units of the printer 20 are controlled by executing programs stored in the ROM and the memory 23, and hence various functions are realized. The communication unit 22 controls communication with the print server device 40 through the network 60. For example, the memory 23 is hard disk or a flash memory, and stores various programs and data. For example, the display 24 is a liquid crystal display panel, and displays various information under control of the controller 21. The operation unit 25 includes a touch panel arranged on a screen of the liquid crystal display panel or a handler such as a numeric keypad, and outputs an operation signal corresponding to operation made by the touch panel or the handler to the controller 21. The image forming unit 26 forms an image based on an image output request (image data and output setting information) received by the communication unit 22, and outputs the image on a medium such as a sheet. Also, the printer 20 may have a finishing unit (not shown) that performs, for example, punching, stapling, and/or folding of sheets having images formed thereon.

The programs stored in the memory 23 of the printer 20 include, for example, a program that, if an error occurs in processing of an image output request received by the communication unit 22, provides GUI for changing output setting information accompanying the image output request and instructing re-output of the image output request such that a user of the printer 20 uses the display 24 and the operation unit 25.

Figure 4:
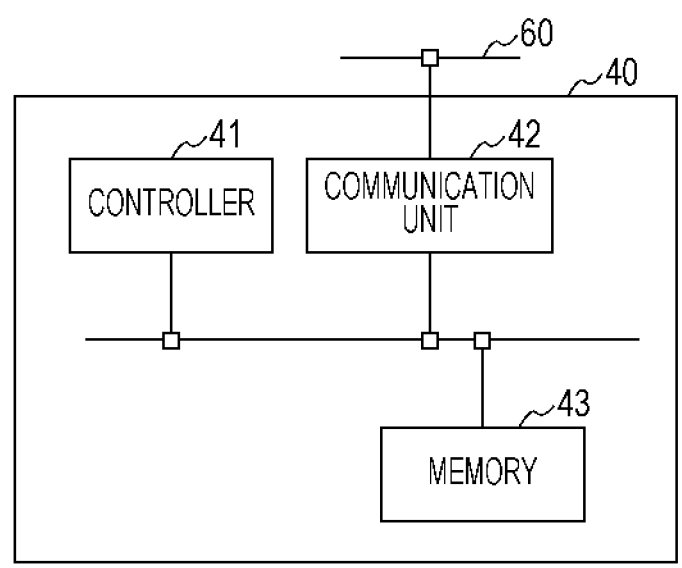
FIG. 4 is a block diagram showing a hardware configuration of a print server device.

The print server device 40 is a computer device that performs management control of image output operation in the image output system 1. As shown in FIG. 4, the print server device 40 includes a controller 41, a communication unit 42, and a memory 43. The controller 41 includes a CPU, a ROM, a RAM, and the like. Respective functions of the print server device 40 (described later) are realized by executing programs stored in the ROM and the memory 43. The communication unit 42 controls communication with the client device 10, and communication with the printer 20, the communication being made through the network 60. For example, the memory 43 is hard disk or a flash memory, and stores various programs and data.

The repository server device 50 is a computer device that stores data (data file) such as a drawing or a document that is a subject of image output. The repository server device 50 functions as a file server that provides the stored data to respective devices connected with the network 60. However, the repository server device 50 does not have to have a function of a file server. For example, when data stored in the memory 13 of the client device 10 is output from the printer 20, the repository server device 50 may realize a function that temporarily stores and holds the data. Also, the repository server device 50 does not have to be independently provided in the system. For example, the repository server device 50 may be integrally provided with the print server device 40.

Operation

Next, operation of the image output system 1 with the above-described configuration is described.

The drawing-output operator, who is a user of the client device 10, uses the operation unit 15 of the client device 10, designates a single printer or plural printers from plural printers (in this exemplary embodiment, the printers 20A, 20B, and 20C) connected with the network 60, and inputs an image output instruction for outputting an image from the designated printer. That is, the operation unit 15 functions as a receiving unit that receives an image output instruction from the user. Data that is the subject of image output may be, for example, data stored in the repository server device 50, or data stored in the memory 13 of the client device 10. The image output instruction input by the drawing-output operator includes, information indicative of the data that is an output subject, identification information of each designated printer, and in addition to such information, output setting information indicative of an output form when the data is output from each printer. The output setting information includes, for example, a sheet size, magnification ratio/reduction ratio, single-sided/double-sided setting, the number of output sheets, margins, the direction of sheets, designation of finishing (stapling, punching, folding into two, or the like). When the data is output from the printer 20C installed in, for example, a remote place, to ensure the security, the image output instruction may include setting of confidential printing such that the data is allowed to be output only if a specific user accepts to perform the outputting.

Based on the image output instruction input by the drawing-output operator, the controller 11 generates image output requests respectively corresponding printers designated by the image output instruction, and transmits the image output requests to the print server device 40. The image output requests each include information indicative of data that is an output subject (for example, a file name of a file stored in the repository server device 50, or the file itself), information (identification information) indicative of a printer that is an output target of the data, and output setting information indicative of output setting when the printer outputs the data.

When the print server device 40 receives the image output request from the client device 10, the print server device 40 reads the data that is the output subject from, for example, the repository server device 50 based on the output setting information included in the image output request, converts the data into image data based on the output setting information included in the image output request, and transfers the image data with the output setting information to the printer 20 designated by the image output request. Also, when the print server device 40 transfers the image data to the printer 20 that is the output target, the print server device 40 transfers information for identifying the image output request and information for identifying the client device 10 that has issued the image output request to the printer 20. The conversion of data by the print server device 40 may include processing of converting data into data with a language and a format that is able to be interpreted by the printer 20 that is the output target (in this case, the print server device 40 has a function corresponding to a printer driver).

The printer 20 stores the received data in the memory 23, forms an image based on the image data and the output setting information included in the received data, and outputs the image on a medium such as a sheet. The data stored in the memory 23 is held for, for example, a predetermined period. The information for identifying the image output request and the information for identifying the client device 10 included in the data stored in the memory 23 is displayed on the display 24 in a form of a list, for example, in accordance with operation by the user with the operation unit 25. At this time, a processing state (output completed, waiting for output, outputting, abnormally ended, etc.) of each image output request may be displayed. The user of the printer 20 watches the list of the image output requests displayed on the display 24, and hence checks a state of an image output request being output or waiting for output and an image output request output in the past. Also, an image output request being output or waiting for output is canceled in accordance with operation with the operation unit 25.

The print server device 40 acquires processing states of the image output requests of the respective printers, and device states of the respective printers (for example, ON/OFF states of power supplies, out of toner, failure, etc.) from the printers 20A to 20C connected with the network 60, and determines processing states of the image output requests received from the client device 10 based on the acquired information and processing states of the image output requests in the print server device 40. The determined processing states of the image output requests are provided from the print server device 40 to the client device 10 periodically or in response to a request from the client device 10. The device states of the printers 20A to 20C and the processing states of the image output requests may be transmitted to the print server device 40 from the printers 20A to 20C such that the print server device 40 makes inquiries to the printers 20A to 20C (poling) and the printers 20A to 20C makes transmission in response to the inquiries. Alternatively, the printers 20A to 20C may make transmission to the print server device 40 when the device states of the printers 20A to 20C or the processing states of the image output requests are changed.

When the controller 11 of the client device 10 receives the processing states of the image output requests from the print server device 40 through the communication unit 12, the controller 11 determines a processing state of the image output instruction input by the user, and displays the processing state on the display 14. That is, the controller 11 corresponds to a processing state acquiring unit, a processing state determining unit, and a display controller.

Hereinafter, a method of determining a processing state of an image output instruction by the client device 10 will be described. First, tables used for determining the processing state of the image output instruction in the client device 10 are described with reference to FIGS. 5A to 7B. The tables include an image-output-request state list table, an image-output-instruction state list table, an image-output-request management table, an image-output-instruction management table, a reference-required state setting table for an image output request, and a reference-required state setting table for an image output instruction.

FIGS. 5A and 5B are illustrations showing an example of an image-output-request state list table and an example of an image-output-instruction state list table. The image-output-request state list table shown in FIG. 5A shows processing states of an image output request in association with numbers indicative of a transition order of the processing states. "Waiting for processing" indicates a state in which an image output request transferred from the client device 10 to the print server device 40 waits for processing in the print server device 40. "Transferring data" indicates a state in which the print server device 40 converts data that is a subject of the image output request to image data. "Waiting for transfer" indicates a state in which the conversion of the data is ended and the converted data waits for transfer to the printer. This state occurs, for example, when a power supply of a printer that is a transfer target is OFF or when the printer is off-line. "Transferring" indicates a state in which the data is being transferred from the print server device 40 to the printer. "Stored in printer" indicates a state in which the image data transferred to the printer is stored in the printer and waits for output. This state occurs, for example, when supply (for example, toner or paper) of the printer is insufficient and the printer waits for supplement. Alternatively, this state may occur when the image output request uses the confidential print function and the printer waits for an output instruction by the user. "Outputting" indicates a state in which the image data transferred to the printer is being output by the printer. "Output completed" indicates a state in which output and finishing of a sheet having an image formed thereon is ended and processing of the image output request is completed. "Cancelled" indicates a state in which the image output request is cancelled by an instruction from the user of the printer or the user (the drawing-output operator) of the client device 10. "Abnormally ended" indicates a state in which an error occurs during the processing of the image output request and the processing of the image output request is interrupted.

The image-output-request state list table is also stored in the memory 43 of the print server device 40. When the print server device 40 determines the processing state of the image output request, the print server device 40 determines one of processing states in the image-output-request state list table as the processing state of the image output request.

The image-output-instruction state list table shown in FIG. 5B shows processing states of an image output instruction in association with numbers indicative of a transition order of the processing states. The processing state of the image output instruction is determined from the processing state of the image output request with which the image output instruction is associated (i.e., the image output request that is issued based on the image output instruction). A specific method of determining the processing state of the image output instruction is described later. The image-output-instruction state list table differs from the image-output-request state list table in that "output completed" that is a state in which all image output requests issued based on an output instruction are completed and "output completed (excluding decentralized output of drawing)" that is a state in which image output requests designated not to be referenced from among the image output requests issued based on the output instruction are completed, are provided as a state arranged downstream the "outputting." The "output completed (excluding decentralized output of drawing" is described later.

FIGS. 6A and 6B are illustrations showing an example of an image-output-request management table and an example of an image-output-instruction management table. This example shows a case in which three image output requests with identification numbers (IDs) of 10001 to 10003 are generated from an image output instruction with an identification number of A0001, and four image output requests with identification numbers of 10004 to 10007 are generated from an image output instruction with an identification number of A0002.

The image-output-request management table shown in FIG. 6A shows an identification number (ID) of each image output request generated based on an image output instruction, a processing state, an identification number of an associated image output instruction, and information (reference-required flag) indicative of whether or not the processing state of the image output request is required to be referenced when the processing state of the associated image output instruction is determined, these pieces of information being associated with each other. A value of the reference-required flag (required or not-required) is determined depending on a printer that each image output request designates as an output target. In particular, reference-required flags of image output requests to the printers 20A and 20B for centralized output of drawings are set to "required," and a reference-required flag of an image output request for decentralized output of drawings is set to "not-required." That is, in the example in FIG. 6A, the image output requests with the identification numbers of 10001, 10002, 10004, 10005, and 10007 are image output requests to the printer 20A or 20B, and the image output requests with the identification numbers of 10003 and 10006 are image output requests to the printer 20C. An image output request with the reference-required flag being "required" in the image-output-request management table is called "reference-required image output request." The processing states of the respective image output requests in the image-output-request management table are received from the print server device 40 and are updated. The contents of the image-output-request management table are displayed on the display 14 in accordance with operation by the user with the operation unit 15. Hence, the user is able to check the processing states of the image output requests. At this time, information (for example, a file name) indicative of drawing data or document data that is an output subject may be also displayed. The values of the reference-required flags respectively associated with the image output requests may be rewritten when the user operates the operation unit 15 while the image-output-request management table is displayed.

The image-output-instruction management table shown in FIG. 6B shows identification numbers (IDs) and processing states of image output instructions, these pieces of information being associated with each other. Although the detail is described later, the processing state of each image output instruction is determined based on the processing state of the associated image output request (i.e., the image output request generated based on the image output instruction) in the image-output-request management table. The contents of the image-output-request management table and the image-output-instruction management table are updated, for example, when image output requests are generated as a result of that the drawing-output operator inputs an image output instruction or when the processing states of the image output requests in the respective printers are changed. The image-output-instruction management table is displayed on the display 14 in accordance with operation by the user with the operation unit 15. Hence, the user is able to check the processing states of the image output instructions.

FIGS. 7A and 7B are illustrations showing an example of a reference-required state setting table for an image output request and an example of a reference-required state setting table for an image output instruction. In the reference-required state setting table for an image output request shown in FIG. 7A, information indicative of necessity of reference (reference-required flag) is set to "required" for the state "abnormally ended" from among the processing states into which an image output request is possibly brought, and information indicative of necessity of reference is set to "not-required" for other processing states. This represents that, in the image-output-request management table shown in FIG. 6A, an image output request is required to be referenced when a processing state of an associated image output instruction is determined if the processing state of the image output request is "abnormally ended" even though the image output request is not required to be referenced when the processing state of the associated image output instruction is determined. In the reference-required setting table for an image output request, a processing state in which the reference-required flag is set to "required" (in this example, the state "abnormally ended") is referred to as "reference-required state of image output request."

In the reference-required state setting table for an image output instruction shown in FIG. 7B, information indicative of necessity of reference (reference-required flag) is set to "required" for the processing state "output completed" from among the processing states into which an image output instruction is possibly brought, and the information indicative of necessity of reference is set to "not-required" for other processing states. This indicates that, in the image-output-request management table shown in FIG. 6A, if the processing state of the image output instruction determined from the processing state of the image output request (reference-required image output request) which is required to be referenced when the processing state of the associated image output instruction is determined is determined as "output completed," the processing state of the image output instruction has to be determined with reference to the processing states of all image output requests generated based on the image output instruction. In the reference-required setting table for an image output instruction, a processing state in which the reference-required flag is set to "required" (in this example, the state "output completed") is referred to as "reference-required state of image output instruction."

The value of the reference-required flags (required or not-required) for the processing states in the reference-required state setting table for an image output request and in the reference-required state setting table for an image output instruction shown in FIGS. 7A and 7B is set by the controller 11 based on, for example, an instruction input by the drawing-output operator with the operation unit 15.

Next, processing performed by the client device 10 when the processing state of the image output instruction is determined by using the aforementioned table is described with reference to a flowchart in FIG. 8. Described as an example is a case in which the processing state of the image output instruction with the identification number of A0001 shown in the image-output-request management table and the image-output-instruction management table shown in FIGS. 6A and 6B is determined. In the following description, the image output instruction with the identification number of A0001 is merely referred to as "image output instruction A0001." The image output request is referred similarly.

When the processing of determining the processing state of the image output instruction is started, the controller 11 of the client device 10 extracts the image output request associated with the image output instruction that the processing state thereof is to be determined, based on the identification number of the image output instruction associated with the respective image output requests in the image-output-request management table stored in the memory 13 (step S1). In this example, the image output requests 10001 to 10003 are extracted as image output requests associated with the image output instruction A0001.

Then, the controller 11 references the reference-required flag in the image-output-request management table, and extracts an image output request (reference-required image output request) with the reference-required flag indicating "required" from among the image output requests extracted in step S1 (step S2). In this example, the image output requests 10001 and 10002 are extracted in step S2.

Then, the controller 11 extracts the image output request with the processing state in which the reference-required flag indicates "required" (i.e., the image output request with the processing state corresponding to "reference-required state of image output request") in the reference-required state setting table for an image output request, from among the image output requests that are extracted in step S1 but not extracted in step S2 (step S3). In this example, the image output request that is extracted in step S1 but not extracted in step S2 is only the image output request 10003, and the processing state thereof is "converting data." Also, the processing state with the reference-required flag indicating "required" in the reference-required state setting table for an image output request is only the state "abnormally ended." Accordingly, in this exemplary embodiment, no image output request is extracted in step S3.

Then, a state candidate for the image output instruction is determined based on the processing states of the image output requests extracted in steps S2 and S3 (step S4). To be more specific, if a processing states other than the processing state "output completed" is included in the processing states of the image output requests extracted in steps S2 and S3, a process-ing state with a largest number indicative of the transition order in the image-output-request state list table shown in FIG. 5A from among the processing states other than the processing state "output completed" is determined as a state candidate for the image output instruction. In this example, the image output requests 10001 and 10002 are extracted in step S2, and no image output request is extracted in step S3. Hence, image output requests to be referenced in step S4 are the image output requests 10001 and 10002. The processing state of the image output request 10001 is "converting data," and the processing state of the image output request 10002 is "waiting for processing." Both processing states are not "output completed." In the image-output-request state list table, the transition order of the state "converting data" is "2," the transition order of the state "waiting for processing" is "1." Hence, the number indicative of the transition order of the state "converting data" is larger than the other. Accordingly, in step S4, a state candidate for the image output instruction A0001 is determined as "converting data." If all processing states of image output requests to be referenced in step S4 are "output completed," in step S4, a state candidate for the image output instruction is determined as "output completed."

Then, the controller 11 judges whether or not the state candidate for the image output instruction determined in step S4 is a processing state with the reference-required flag indicating "required" (i.e., "reference-required state of image output instruction") in the reference-required state setting table for an image output instruction in FIG. 7B (step S5). If the state candidate for the image output instruction determined in step S4 is not the processing state with the reference-required flag indicating "required" in the reference-required state setting table for an image output instruction (NO in step S5), the process goes to step S6, in which the state candidate for the image output instruction determined in step S4 is determined as the processing state of the image output instruction. In this example, the state candidate for the image output instruction A0001 determined in step S4 is in the state "converting data," while the processing state with the reference-required flag indicating "required" in the reference-required state setting table for an image output instruction in FIG. 7B is "output completed." Thus, the judgment result in step S5 is "NO," and hence the processing state of the image output instruction A0001 is determined as "converting data" in step S6.

In contrast, if the state candidate for the image output instruction determined in step S4 is the processing state with the reference-required flag indicating "required" in the reference-required state setting table for an image output instruction (YES in step S5), the process goes to step S7. In this example, the judgment result in step S5 becomes "YES" only if the state candidate for the image output instruction determined in step S4 is in the state "output completed." In step S7, the state candidate for the image output instruction is determined based on the processing states of the image output requests extracted in step S1 (i.e., all image output requests generated based on an image output instruction). A method of determining the state candidate for the image output instruction in step S7 is the same as the method of determining the state candidate in step S4. In particular, if the processing states of the image output requests extracted in step S1 include processing states other than "output completed," from among these processing states other than "output completed," in the image-output-request state list table shown in FIG. 5A, a processing state with a number indicative of the transition state being the largest is determined as a state candidate for an image output instruction. If the processing states of all image output requests are "output completed," the state candidate for the image output instruction is determined as "output completed."

After step S7, the controller 11 judges whether or not the transition order of the state candidate for the image output instruction determined in step S7 is earlier than the state candidate for the image output instruction determined in step S4 (in this example, the state "output completed") (i.e., in the image-output-instruction state list table shown in FIG. 5B, the number indicative of the transition order of the state candidate in step S7 is smaller than that of the state candidate in step S4) (step S8). If the transition order of the state candidate for the image output instruction determined in step S7 is earlier than the transition order of the state candidate for the image output instruction determined in step S4 (YES in step S8), the process goes to step S9, in which a processing state with a previous transition order of the transition order of the state candidate for the image output instruction determined in step S4 (i.e., "output completed (excluding decentralized output of drawing") is determined as the processing state of the image output instruction. If the state candidate for the image output instruction determined in step S7 is not the processing state with the transition order earlier than the transition order of the state candidate for the image output instruction determined in step S4 (NO in step S8), the process goes to step S10, in which the state candidate determined in step S7 is determined as the processing state of the image output instruction. In this example, the judgment result in step S8 becomes "NO" if the state candidate for the image output instruction determined in step S7 is "output completed," "canceled," or "abnormally ended."

First Example of State Transition

Next, the method of determining the processing state of the image output instruction is further described by using a specific example of state transition. FIG. 9 is a table showing an example of state transition of an image output instruction and image output requests generated from the image output instruction. In this example, like the example shown in FIGS. 6A and 6B, three image output requests 10001, 10002, and 10003 are generated from an image output instruction A0001. The image output requests 10001, 10002, and 10003 are image output requests that designate the printers 20A, 20B, and 20C as output targets. The image output requests 10001 and 10002 that designate the printers 20A and 20B for centralized output of drawings as output targets are "reference-required image output requests." Further, when the processing state of the image output instruction is determined by using the flowchart in FIG. 8, the tables shown in FIGS. 5A to 7B (the image-output-request state list table, the image-output-instruction state list table, the image-output-request management table, the image-output-instruction management table, the reference-required state setting table for an image output request, and the reference-required state setting table for an image output instruction) are used.

The table in FIG. 9 shows processing states of the image output requests 10001 to 10003 and processing states of the image output instruction A0001 in first to seventh stages, a state progressing in that order. The processing state of the image output instruction A0001 in each stage is determined based on the processing states of the image output requests 10001 to 10003 according to the flowchart shown in FIG. 8.

The first stage is a state immediately after the client device 10 sends image output requests to the print server device 40 based on an image output instruction input by a drawing-output operator. The processing states of the image output requests 10001 to 10003 are "waiting for processing." In this case, the image output requests 10001 to 10003 are extracted as image output requests associated with the image output instruction A0001 in step S1 of the flowchart in FIG. 8, and the image output requests 10001 and 10002 are extracted as reference-required image output requests in step S2. No image output request is extracted in step S3. In step S4, the state "waiting for processing" is determined as a state candidate for the image output instruction. The state candidate "waiting for processing" is not "reference-required state of image output instruction" (in this example, the state "output completed"). The judgment result in step S5 becomes "NO," and the processing state of the image output instruction A0001 is determined as "waiting for processing" in step S6.

The second stage is a state when data conversion for part of the image output requests (the image output requests 10001 and 10003) is started in the print server device 40. The processing in steps S1 to S3 of the flowchart in FIG. 8 for the second stage is similar to the processing for the first stage. In step S4, the state "converting data" is determined as a state candidate for the image output instruction. The state candidate "converting data" is not "reference-required state of image output instruction." The judgment result in step S5 becomes "NO," and the processing state of the image output instruction A0001 is determined as "converting data" in step S6.

The third stage is a state when the data conversion for the image output requests 10001 and 10003 are ended and transfer of the image output request 10001 to the printer 20A is started. The processing state of the image output request 10003 is "waiting for transfer." This processing state appears, for example, when the power supply of the printer 20C, which is an output target of the image output request 10003, is OFF. In the third stage, data conversion of the image output request 10002 by the print server device 40 is started. The processing in steps S1 to S3 of the flowchart in FIG. 8 for the third stage is similar to the processing for the first stage. In step S4, the state "transferring" is determined as a state candidate for the image output instruction. The state candidate "transferring" is not "reference-required state of image output instruction." The judgment result in step S5 becomes "NO," and the processing state of the image output instruction A0001 is determined as "transferring" in step S6.

The fourth stage is a state when the transfer of the image output request 10001 to the printer 20A is ended and output by the printer 20A is started. Also, transfer of the image output request 10002 to the printer 20B is started. The processing state of the image output request 10003 is still "waiting for transfer." The processing in steps S1 to S3 of the flowchart in FIG. 8 for the fourth stage is similar to the processing for the first stage. In step S4, the state "outputting" is determined as a state candidate for the image output instruction. The state candidate "outputting" is not "reference-required state of image output instruction." The judgment result in step S5 becomes "NO," and the processing state of the image output instruction A0001 is determined as "outputting" in step S6.

The fifth stage is a state in which output by the printer 20A based on the image output request 10001 is ended and the processing state of the image output request 10001 is "output completed." Also, transfer of the image output request 10002 to the printer 20B is ended and output by the printer 20B is started. The processing state of the image output request 10003 is still "waiting for transfer." The processing in steps S1 to S3 of the flowchart in FIG. 8 for the fifth stage is similar to the processing for the first stage. In step S4, the state "outputting" is determined as a state candidate for the image output instruction. The state candidate "outputting" is not "reference-required state of image output instruction." The judgment result in step S5 becomes "NO," and the processing state of the image output instruction A0001 is determined as "outputting" in step S6.

The sixth stage is a state in which output by the printer 20B based on the image output request 10002 is ended and the processing state of the image output request 10002 is "output completed." That is, in the sixth stage, output of the image output requests (the image output requests 10001 and 10002) for centralized output of drawings is completed. The processing state of the image output request 10003 is still "waiting for transfer." The processing in steps S1 to S3 of the flowchart in FIG. 8 for the sixth stage is similar to the processing for the first stage. In step S4, the state "output completed" is determined as a state candidate for the image output instruction. This state candidate "output completed" is "reference-required state of image output instruction." Hence, the judgment result in step S5 becomes "YES" and the process goes to step S7. In step S7, "waiting for transfer" is determined as a state candidate for the image output instruction A0001 based on the processing states of the image output requests 10001 to 10003. Since the transition order of the state candidate "waiting for transfer" for the image output instruction determined in step S7 is earlier than the transition order of the state candidate "output completed" for the image output instruction determined in step S4, the judgment result in step S8 becomes YES. In step S9, a processing state with a previous transition order of the transition order of the state candidate for the image output instruction determined in step S4 (i.e., the state "output completed (excluding decentralized output of drawing") is determined as the processing state of the image output instruction.

The seventh stage is a state in which the processing state of the image output request 10003 becomes "output completed" as the result of that the power supply of the printer 20C, which is the output target printer of the image output request 10003, is turned ON and image output for the image output request 10003 is ended. That is, the seventh stage is a state in which not only output of image output requests for centralized output of drawings but also output of an image output request (the image output request 10003) for decentralized output of drawings are completed. The processing in steps S1 to S5 of the flowchart in FIG. 8 for the seventh stage is similar to the processing for the sixth stage. In step S7, the state "output completed" is determined as a state candidate for the image output instruction A0001 based on the processing states of the image output requests 10001 to 10003. Since the transition order of the state candidate "output completed" for the image output instruction determined in step S7 is not earlier than the transition order of the processing state "output completed" of the image output instruction determined in step S4, the judgment result becomes "NO" in step S8. In step S10, the state candidate ("output completed") determined in step S7 is determined as the processing state of the image output instruction.

As described above, with this exemplary embodiment, if image output requests generated from an image output instruction include image output requests to the printers 20A and 20B for centralized output of drawings under control of the drawing-output operator and an image output request to the printer 20C for decentralized output of drawings not under control of the drawing-output operator, even though processing of the image output request to the printer 20C for decentralized output of drawings is delayed or stopped, when processing of the image output requests to the printers 20A and 20B for centralized output of drawings is completed (i.e., when processing states of these image output requests become "output completed"), a processing state of the image output instruction becomes "output completed (excluding decentralized output of drawing)." Hence, even though the drawing-output operator does not check the individual processing states of the image output requests, the drawing-output operator recognizes that all image output requests to the printer 20A or 20B for centralized output of drawings are completed, from the processing state of the image output instruction, and shifts to next work such as preparation for sending to a distribution target. A work time is reduced.

Also, as described in relation to the sixth stage, with this exemplary embodiment, if the processing state (candidate) of the image output instruction determined based on the processing states of the image output requests for centralized output of drawings is a predetermined processing state ("output completed"), the processing state of the image output instruction is determined again with reference to the processing states of the image processing request for decentralized output of drawings. Not only the processing states of the image output requests for centralized output of drawings but also the processing state of the image output request for decentralized output of drawings are reflected on the processing state of the image output instruction ("output completed (excluding decentralized output of drawing)").

Second Example of State Transition

FIG. 10 is a table showing another example of state transition of an image output instruction and image output requests generated from the image output instruction. The state transition example shown in FIG. 10 differs from the state transition example shown in FIG. 9 only for a seventh stage. Hence, description for the first to sixth stages is omitted, and only the seventh stage is described.

Figure 8:
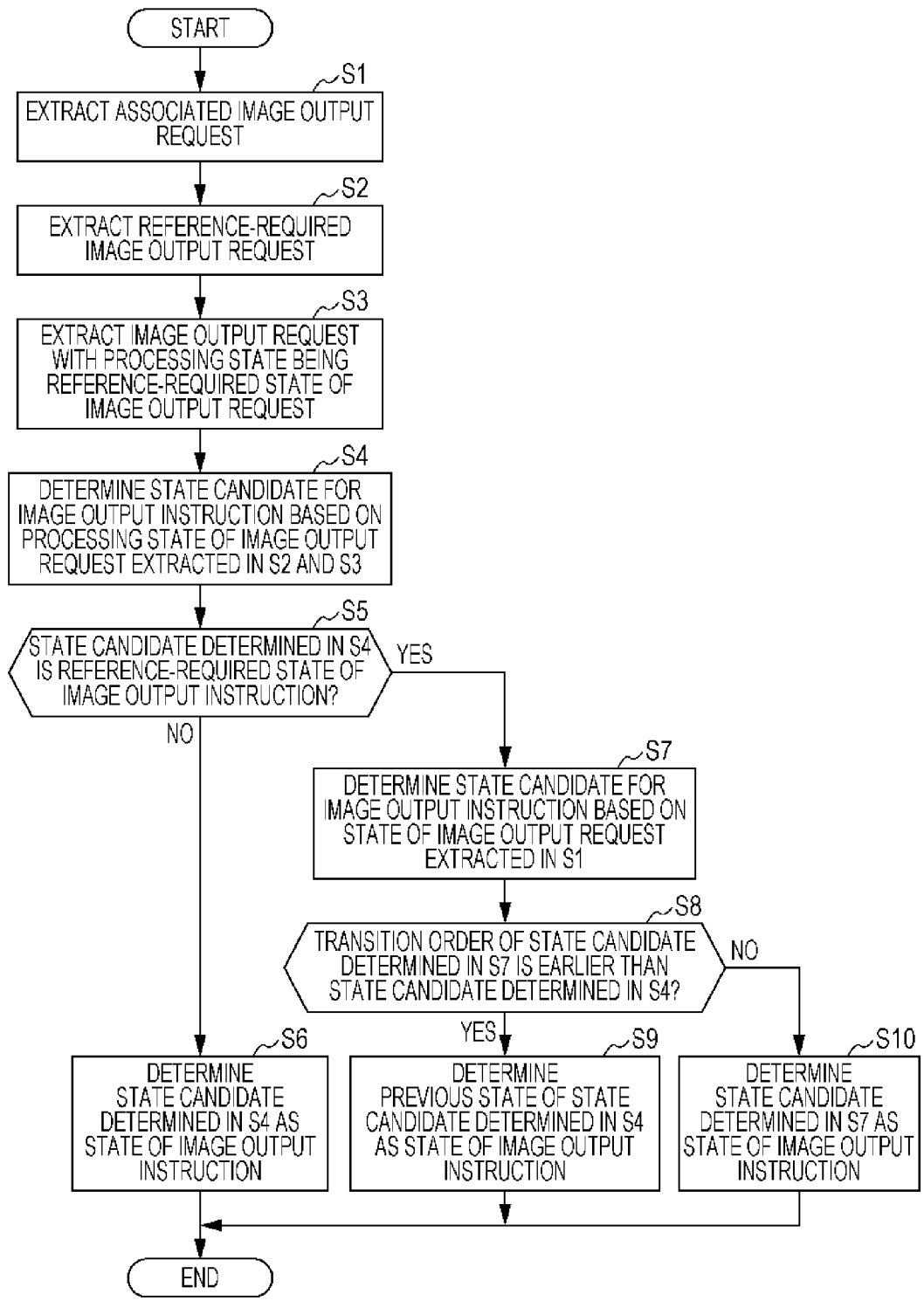
FIG. 8 is a flowchart showing processing of determining a processing state of an image output instruction.

The seventh stage in the state transition example of FIG. 10 is a state in which, although the power supply of the printer 20C, which is the output target printer of the image output request 10003, is tuned ON and processing for the image output request 10003 is performed, an error occurs, and the processing becomes "abnormally ended." Processing in steps S1 and S2 of the flowchart in FIG. 8 in this case is similar to that for the first stage. In step S3, the image output request 10003 is extracted. The processing state of the image output request 10003 is "abnormally ended." This is "reference-required state of image output request" shown in the reference-required state setting table for an image output request. As the result, in step S4, the state candidate for the image output instruction A0001 is determined as "abnormally ended" based on the processing states of the image output requests 10001 and 10002 extracted in step S2 and the processing state of the image output request 10003 extracted in step S3. The state candidate "abnormally ended" is not "reference-required state of image output instruction" (in this example, "output completed"). The judgment result in step S5 becomes "NO," and the processing state of the image output instruction A0001 is determined as "abnormally ended" in step S6.

As described above, in this exemplary embodiment, if image output requests generated from an image output instruction include image output requests to the printers 20A and 20B for centralized output of drawings under control of the drawing-output operator and an image output request to the printer 20C for decentralized output of drawings not under control of the drawing-output operator, abnormal end of the image output request to the printer 20C for decentralized output of drawings is reflected on the processing state of the associated image output instruction.

Re-Output Processing

For example, the user (drawing-output operator) of the client device 10 or the user of the printer 20 may instruct re-output for an image output request that is "abnormally ended" or "canceled" in the printer 20. The instruction for re-output is made such that the controller 21 displays a soft-key for instructing re-output when the controller 21 displays a list of image output requests on the display 24 in accordance with operation by the user of the printer 20 with the operation unit 25, the user designates an image output request that the user wants to re-output by using the operation unit 25 and touches the soft-key for instructing re-output, and the controller 21 detects the tough. Also, the controller 21 displays output setting information of the designated image output request in accordance with the designation operation for the image output request by the user, and allows the user to change the output setting information with the operation unit 25.

FIGS. 11A and 11B are flowcharts showing processing by the print server device 40 and by the client device 10 when re-output is instructed. As shown in FIGS. 11A and 11B, in step S101, the controller 41 of the print server device 40 receives a re-output instruction from the client device 10 or the printer 20 through the communication unit 42. The re-output instruction includes an identification number of an image output request that is desired to be re-output (hereinafter, referred to as "original image output request") and output setting information that is changed for re-output.

Then, in step S102, the controller 41 of the print server device 40 generates an image output request for re-output (referred to as "image re-output request") based on the received re-output instruction. The generated image re-output request includes information indicative of data which is an output subject, identification information of a printer which is an output target of the data, and output setting information. The information indicative of the data which is the output subject and the identification information of the printer which is the output target of the data are the same as those of the original image output request. For the output setting information that is instructed to be changed by the re-output instruction, the changed output setting information is applied. For the output setting information that is not instructed to be changed, the output setting information of the original image output request is continuously applied. In step S102, the controller 41 transmits information relating to the generated image re-output request to the client device 10. The information relating to the image re-output request includes an identification number of the image re-output request and an identification number of an image output instruction with which the image re-output request is associated. Here, the identification number of the image output instruction with which the image re-output request is associated is the same as the identification number of the image output instruction with which the original image output request is associated.

The client device 10 receives the information relating to the image re-output request from the print server device (step S201), and adds the identification number of the image re-output request and the identification number of the image output instruction, with which the image re-output request is associated, included in the information relating to the received image re-output request, to the image-output-request management table (step S202). At this time, a value of a reference-required flag of the image re-output request in the image-output-request management table is the same as that of the original image output request. Also, the client device 10 sets a "completely excluded" flag for the original image output request so that the original image output request is not referenced when the processing state of the associated image output instruction is determined (step S203). The image output request with the "completely excluded" flag being set is excluded from the image output requests to be extracted in step S1 of the flowchart in FIG. 8.

FIG. 12 illustrates an example in which, when the re-output instruction is made for the image output request 10003 in the image-output-request management table in FIG. 6A, an image output request with an identification number of 10008 as an image re-output request is added to the image-output-request management table. As shown in FIG. 12, the added image re-output request 10008 is associated with the same identification number as the identification number (A0001) of the image output instruction with which the original image output request 10003 is associated. Also, the "completely excluded" flag is set for the original image output request 10003.

In step S103, the print server device 40 performs processing for image output based on the generated image re-output request. To be more specific, data designated by the image re-output request is converted into image data based on output setting information included in the image re-output request, and the obtained image data is transferred to a printer which is an output target. Also in step S103, the print server device 40 determines a processing state of the image re-output request in accordance with the progress of the processing, and transmits the processing state to the client device 10.

The client device 10 determines a processing state of the image output instruction with which the image re-output request is associated based on the processing state of the image re-output request received from the print server device 40 and processing states of other image output requests associated with the image output instruction according to the flowchart in FIG. 8, and displays the processing state on the display 14 (step S204). For example, if the image output request 10003 is re-output after the seventh stage of the state transition example shown in FIG. 10 (in which the processing states of the image output requests 10001 and 10002 are "output completed," the processing state of the image output request 10003 is "abnormally ended," and the processing state of the image output instruction A0001 is "abnormally ended"), the new image processing request 10008 is generated, the processing is normally ended, and the processing state becomes "output completed," the processing state of the image output instruction A0001 is determined according to the flowchart in FIG. 8 based on the processing states of the image output requests 10001, 10002, and 10008 (all processing states indicating "output completed"). Like the case of the seventh stage in the state transition example shown in FIG. 9, the processing state of the image output instruction A0001 becomes "output completed." Hence, for example, even if the re-output instruction is made by the user of the printer 20, the user of the client device 10 (the drawing-output operator) is able to recognize that the re-output is normally ended from the processing state of the image output instruction.

As described above, in this exemplary embodiment, when re-output of an image output request is instructed, a new image output request for re-output (image re-output request) is generated, and the generated image re-output request is associated with an image output instruction with which the original image output request is associated. Meanwhile, the original image output request is excluded from reference subjects when the processing state of the image output instruction with which the original image output request is associated is determined. Hence, the processing state of the image re-output request is reflected on the processing state of the image output instruction with which the original image re-output request is associated.

Modifications

The exemplary embodiment of the present invention has been described above; however, the exemplary embodiment may be modified as follows. Also, the following modifications may be combined.

First Modification

In the above-described exemplary embodiment, the printers 20A to 20C are used as devices for output targets of image data. However, the present invention is not limited thereto. For example, the form of output of image data may be e-mail transmission to an address identified by an e-mail address, facsimile transmission to a facsimile device, or data transfer to a desired folder in a file system of an information processing device. In this case, an image-output-request state list table corresponding to e-mail transmitting processing may be defined as shown in FIG. 13A, an image-output-request state list table corresponding to facsimile transmitting processing may be defined as shown in FIG. 13B, and an image-output-request state list table corresponding to data transfer processing to a folder may be defined as shown in FIG. 13C.

Second Modification

In the above-described exemplary embodiment, a single client device is used as the client device to which an image output instruction is input; however, the present invention is not limited thereto. The image output system 1 may include two or more client devices.

Third Modification

In the above-described exemplary embodiment, the print server device 40 transfers image data to the printer 20 as an output target without a request made by the printer 20; however, the present invention is not limited thereto. The print server device 40 may notify the printer 20 of only the presence of image data to be output, and transfer the image data to the printer 20 only if the notified printer 20 makes a transfer request.

Fourth Modification

The controllers 11, 21, and 41 each may include an application specific integrated circuit (ASIC). In this case, the functions of the controller 11 may be realized by the ASIC or may be realized by the CPU and the ASIC.

Fifth Modification

The programs that realize the functions of the controllers 11, 21, and 41 may be stored in a computer readable medium, such as a magnetic storage medium (magnetic tape, magnetic disk (HDD, flexible disk (FD)), or the like), an optical storage medium (optical disk (compact disc (CD), digital versatile disk (DVD), or the like), a magneto-optical storage medium, a semiconductor memory, or the like, and the programs may be installed in the memories 13, 23, and 43. Alternatively, the programs may be downloaded through a communication line and may be installed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image output instructing device, comprising:
   a receiving unit that receives an image output instruction which is an instruction of image output to information processing devices selected from a plurality of information processing devices including at least an information processing device belonging to a first group and at least an information processing device belonging to a second group;
   a processing state acquiring unit that acquires processing states of a plurality of image output requests which are generated based on the image output instruction received by the receiving unit and respectively request the selected information processing devices to perform image output;
   a processing state determining unit that, if the plurality of image output requests include an image output request to the information processing device belonging to the first group and an image output request to the information processing device belonging to the second group, determines a processing state of the image output instruction based on the processing state of the image output request to the information processing device belonging to the first group acquired by the processing state acquiring unit, regardless of at least part of processing states into which the image output request to the information processing device belonging to the second group is possibly brought; and
   a display controller that causes the determined processing state of the image output instruction to be displayed on a display.

2. The image output instructing device according to claim 1, wherein, when processing of the image output request to the information processing device belonging to the first group is completed, the processing state determining unit determines the processing state of the image output instruction as a processing state indicative of that the processing of the image output request to the information processing device belonging to the first group is completed, regardless of at least part of the processing states into which the image output request to the information processing device belonging to the second group is possibly brought.

3. The image output instructing device according to claim 1, wherein, if the processing state of the image output request to the information processing device belonging to the second group is a predetermined processing state, the processing state determining unit determines the processing state of the image output instruction based on the predetermined processing state of the image output request to the information processing device belonging to the second group and the processing state of the image output request to the information processing device belonging to the first group.

4. The image output instructing device according to claim 1, wherein, if the processing state of the image output instruction determined based on the processing state of the image output request to the information processing device belonging to the first group is a predetermined processing state, the processing state determining unit determines the processing state of the image output instruction based on the processing state of the image output request to the information processing device belonging to the first group and the processing state of the image output request to the information processing device belonging to the second group.

5. The image output instructing device according to claim 1, further comprising:
- an associating unit that associates the plurality of image output requests generated based on the image output instruction received by the receiving unit with the image output instruction,
- wherein the associating unit associates an image output request which is newly generated based on an instruction of re-output to an image output request designated from among the plurality of image output requests and requests the same information processing device as an information processing device of the designated image output request to perform the re-output of an image, with the image output instruction, and invalidates association of the designated image output request with the image output instruction, and
- wherein the processing state determining unit determines the processing state of the image output instruction based on a processing state of the image output request associated with the image output instruction by the associating unit.

6. A non-transitory computer readable medium storing a program causing a computer to execute a process for image output instruction, the process comprising:
- receiving an image output instruction which is an instruction of image output to information processing devices selected from a plurality of information processing devices including at least an information processing device belonging to a first group and at least an information processing device belonging to a second group;
- acquiring processing states of a plurality of image output requests which are generated based on the received image output instruction and respectively request the selected information processing devices to perform image output;
- if the plurality of image output requests include an image output request to the information processing device belonging to the first group and an image output request to the information processing device belonging to the second group, determining a processing state of the image output instruction based on the acquired processing state of the image output request to the information processing device belonging to the first group, regardless of at least part of processing states into which the image output request to the information processing device belonging to the second group is possibly brought; and
- causing the determined processing state of the image output instruction to be displayed on a display.

7. An image output instructing method, comprising:
- receiving an image output instruction which is an instruction of image output to information processing devices selected from a plurality of information processing devices including at least an information processing device belonging to a first group and at least an information processing device belonging to a second group;
- acquiring processing states of a plurality of image output requests which are generated based on the received image output instruction and respectively request the selected information processing devices to perform image output;
- if the plurality of image output requests include an image output request to the information processing device belonging to the first group and an image output request to the information processing device belonging to the second group, determining a processing state of the image output instruction based on the acquired processing state of the image output request to the information processing device belonging to the first group, regardless of at least part of processing states into which the image output request to the information processing device belonging to the second group is possibly brought; and
- causing the determined processing state of the image output instruction to be displayed on a display.

* * * * *